United States Patent [19]

Mitoff

[11] 4,151,641

[45] May 1, 1979

[54] METHODS OF MAKING AN IMPROVED SENSING ELEMENT AND AN IMPROVED SENSOR ASSEMBLY FOR A HALOGEN GAS LEAK DETECTOR

[75] Inventor: Stephan P. Mitoff, Clifton Park, N.Y.

[73] Assignee: General Electric Company, Schenectady, N.Y.

[21] Appl. No.: 879,084

[22] Filed: Feb. 21, 1978

[51] Int. Cl.$^2$ .............................................. H01C 7/00
[52] U.S. Cl. ........................................ 29/611; 29/620
[58] Field of Search ......................... 29/611, 610, 620; 324/33; 315/111

[56] References Cited

U.S. PATENT DOCUMENTS

| | | | |
|---|---|---|---|
| 3,083,445 | 4/1963 | Hill | 29/610 |
| 3,471,746 | 10/1969 | Roberts | 315/111 |
| 3,974,561 | 8/1976 | Schnoeller | 29/611 |
| 3,991,360 | 11/1976 | Orth | 324/33 |

Primary Examiner—C. W. Lanham
Assistant Examiner—Gene P. Crosby

Attorney, Agent, or Firm—Paul R. Webb, II; Joseph T. Cohen; Leo I. MaLossi

[57] ABSTRACT

Methods are described for making an improved sensing element and an improved sensor assembly for a halogen gas leak detector. The method of making an improved sensing element includes positioning at least one porous ceramic tubular element doped with sodium carbonate in a high temperature, non-reactive container, surrounding and covering the element with sodium beta-alumina particles, and baking the element in a furnace overnight at a temperature in the range from 1400° C. to 1450° C. The method of making an improved sensor assembly includes the above steps after which a helical heater coil is wrapped snugly around the tubular element, and a platinum wire electrode is positioned substantially within and supported by the tubular element. A suitable cement is applied over the entire helical heater coil and the immediate juxtaposed portions of the tubular element. The sensor assembly is then surrounded by and covered with sodium beta-alumina in a high temperature, non-reactive container. The cement is then cured at 1300° C. for one to three hours.

6 Claims, No Drawings

METHODS OF MAKING AN IMPROVED SENSING ELEMENT AND AN IMPROVED SENSOR ASSEMBLY FOR A HALOGEN GAS LEAK DETECTOR

This invention relates to methods of making sensing elements and sensor assemblies and, more particularly, to such methods of making sensing elements and sensor assemblies for halogen gas leak detectors by producing a variation in electrical current between a pair of spaced-apart electrodes.

The sensing element and the sensor assembly of the present invention are useful in such halogen gas leak detectors. In U.S. Pat. No. 3,991,360 there is described and claimed a sensor assembly for the above type of halogen gas leak detector. Such a sensor assembly comprises a porous doped ceramic tubular element, a helical heater coil wrapped snugly around the tubular element, and a platinum wire electrode positioned substantially completely within and supported by said tubular element, the tubular element being doped with a dopant taken from the class including carbonates of sodium, lithium, potassium, cesium and rubidium, the coil and electrode being provided with terminal means for supplying a heating current through the coil and for applying a biasing voltage across the ceramic between the coil and electrode. Sodium carbonate is recited specifically as a dopant. This patent is assigned to the same assignee as the present application.

My present invention is directed to a method of making an improved sensing element and an improved sensor assembly for a halogen gas sensor.

The primary object of my invention is to provide methods of making improved sensing elements and improved sensor assemblies for halogen gas leak detectors which will exhibit improved and reproducible sensitivity.

In accordance with one aspect of my invention, a method of making an improved sensing element for a halogen gas leak detector includes positioning at least one porous ceramic tubular element doped with sodium carbonate in a high-temperature, non-reactive container, surrounding and covering the element with sodium beta-alumina particles, and baking the element in a furnace from eight to twelve hours at a temperature in the range from 1400° C. to 1450° C.

These and various other objects, features, and advantages of the invention will be better understood from the following description.

In the above-identified U.S. Pat. No. 3,991,360, there is described a sensor assembly for a halogen gas leak detector. The present invention is directed to making an improved sensing element and an improved sensor assembly for such a halogen gas leak detector.

Such a halogen gas leak detector includes an impervious cylindrical housing mounted in sealing relationship to a base that has a plurality of terminals mounted in a typical circular pattern thereon. The detector also includes a gas inlet port, which extends through the base into the interior of housing. In like manner, a gas exhaust port is provided at the upper end of the detector and extends through the top surface of the housing, so that in operation, gas can flow into the gas inlet port, through the housing, past a sensor assembly in the housing and then be exhausted from the housing through the gas outlet port. Removable fittings for the ports can be provided so that they may be sealed when not in use or connected into an appropriate sampling system while in use. These components can be selected from a number of commercially available alternatives suitable for use in forming the basic halogen gas detector structure that is used in combination with the sensor assembly of the subject patent.

In the subject patent, the sensor assembly comprises a porous, doped, ceramic tubular element and a helical anode heater coil mounted in a conventional manner on the base. The sensor assembly also includes a platinum hairpin electrode that is positioned substantially completely within the parallel bores through the tubular element. The porous alumina ceramic element is doped with a dopant taken from the class including the carbonates of sodium, lithium, potassium, cesium and rubidium. Such a dopant is adequately dispersed and reacted in the interstices of the porous ceramic element. In method of applying alkali metal to the interstices of the porous tubular element, a fluid dopant is utilized. A suitable porous ceramic tubular element is provided, and a dopant consisting essentially of between 85 and 65 percent by weight water and between 15 and 35 percent sodium carbonate ($Na_2CO_3$) is provided in a moisture tight bottle. Next, the tubular element is submerged in the dopant within the covered moisture tight bottle and gently agitated to remove entrapped air from the dopant. Such agitation is not essential, but it has been found to be desirable in order to increase the efficiency of the operation. The tubular element is then allowed to soak in the dopant for at least 4 hours, after which it is removed from the bottle of dopant and placed in a loosely covered platinum container and baked in a furnace for about 1 hour at approximately 1200° C. in order to remove substantially all of the moisture from the porous ceramic tubular element and leave the sodium carbonate dopant trapped and reacted in the pores of the element.

I found that I can make an improved sensing element of porous ceramic tubular element doped with sodium carbonate and an improved sensor assembly. Various porous ceramic materials may be used to form the tubular element, such as commercially available porous alumina sold under the tradename Alsimag No. 548, or commercially available porous activated alumina granules sold under the tradename Alcoa type F-1 alumina maufactured by the Aluminum Company of America. The tubular element is made by conventional ceramic techniques. The alkali metal can be applied to the interstices of the porous tubular element by a fluid dopant. The porous ceramic tubular element is provided, and a dopant consisting essentially of between 85 and 65 percent by weight water and between 15 and 35 percent sodium carbonate ($Na_2CO_3$) is provided in a moisture tight bottle. Next, the tubular element is submerged in the dopant within the covered moisture tight bottle and gently agitated to remove entrapped air from the dopant. Such agitation is not essential, but it has been found to be desirable in order to increase the efficiency of the operation. The tubular element is then allowed to soak in the dopant for at least four hours. The element is then removed from the bottle of dopant, drained and dried at a preferred temperature of 71° C. The element is then placed in a high temperature, non-reactive container, such as platinum or alumina. One or a plurality of such elements are placed in the container at the same time. The element or elements are then surrounded and covered with sodium beta-alumina, and baked in a furnace overnight, for example, from 8 to 12 hours at a temperature from 1400° C. to 1450° C.

The preferred element is made of a high purity alumina. The term sodium beta-alumina as used in this application, includes sodium beta-alumina, sodium beta''-alumina, sodium beta'''-alumina, sodium beta''''-alumina and mixtures thereof. My method results in an improved sensing element for use in a sensor assembly in a halogen gas leak detector wherein the sodium carbonate is retained within the element and not subject to more than nominal loss during the baking step of the method. The resulting sensing element, when used in a sensor assembly in a halogen gas leak detector, provides a leak detector with improved sensitivity, which sensitivity is very reproducible.

As opposed to the subject patent, the element is drained and dried at 71° C. In the subject patent, the element is placed in a loosely covered platinum container and baked. In my improved method, the element is surrounded and covered with sodium beta-alumina in the container and baked in a furnace overnight, for example, for 8 to 12 hours at a temperature from 1400° C. to 1450° C.

In my method of making an improved sensor for a halogen gas leak detector, the above steps are followed to produce an improved sensing element. A helical heater coil is then wrapped snugly around the ceramic tubular element. A platinum wire electrode is positioned substantially completely within and supported by the tubular element. A cured refractory cement coating is disposed over substantially the entire helical heater coil and the immediately juxtaposed portions of the tubular element to secure the coil in fixed position on the element.

As described in the subject patent and as used in my method, any suitable cement may be used to form the coating, such as commercially available Norton cement (EA-139) which is a low silica cement that matures when fired at about 1300° C. The thickness of the cement coating may vary between the range of 6/1000ths of an inch in the tube center to 3/100ths of an inch over the lead ends from the platinum wire electrode. The refractory cement may be either brushed, dipped or sprayed into position. It has also been found desirable in some applications of the sensor assembly to continue the cement coating over the ends of the platinum electrode where it emerges from the tube to securely lock the central electrode in position within the tubular element.

The above sensor assembly is then positioned in a high temperature, non-reactive container. The sensor assembly is surrounded and covered with sodium beta-alumina. The sensor assembly is baked in a furnace for about 1 hour at 1300° C. to cure the cement. The sensor assembly is then cleaned off. The resulting sensor assembly is made in accordance with the method of my invention.

Examples of improved sensing elements and of improved sensor assemblies for halogen gas leak detectors made in accordance with my invention are set forth below:

EXAMPLE I

Sensing elements were formed by providing porous ceramic tubular elements of high purity alumina. Each element was made by conventional ceramic techniques. Sodium metal was applied to the interstices of each porous tubular element by a fluid dopant. The dopant consisted essentially of 75 percent by weight water and 25 percent sodium carbonate. Each tubular element was submerged in the dopant within a covered moisture-type bottle and gently agitated to remove entrapped air from the dopant. Each tubular element was then allowed to soak in the dopant for at least four hours. Each element was then removed from the bottle of dopant, drained and dried at a temperature of 71° C.

One hundred fifty elements were prepared in the above manner. These elements were then placed in a high temperature, non-reactive container of alumina. Sodium beta-alumina was placed beneath, between and over the elements so that the elements were surrounded and covered with the sodium beta-alumina. The elements were then baked in a furnace overnight, that is for a period of 12 hours, at a temperature from 1400° C. to 1450° C. These elements were made in accordance with the method of my invention.

EXAMPLE II

Improved sensor assemblies for halogen gas leak detectors were made by employing the tubular elements from Example I. A helical heater coil was wrapped snugly around each ceramic tubular element. A platinum wire electrode in the form of a hairpin was positioned substantially completely within and supported by each tubular element. A low silica cement which matures when fired at about 1300° C. was disposed over substantially the entire helical heater coil and the immediately juxtaposed portions of each tubular element to secure the coil in a fixed position on each element.

The above sensor assemblies were then positioned in a high temperature, non-reactive container of alumina. The sensor assemblies were surrounded and covered with sodium beta-alumina. The sensor assemblies were baked in a furnace for about one hour at 1300° C. to cure the element. The resulting sensor assemblies were made in accordance with the method of my invention.

EXAMPLE III

Several of the sensor elements from Example II were assembled into halogen gas leak detectors as described above. These leak detectors provided high and very reproducible sensitivities.

While other modifications of the invention and variations thereof which may be employed within the scope of the invention have not been described, the invention is intended to include such as may be embraced within the following claims.

What I claim and desire to secure by Letters Patent of the United States is:

1. A method of making an improved sensing element for a halogen gas leak detector comprises providing at least one porous ceramic tubular element doped with sodium carbonate, positioning at least one such element in a high temperature, non-reactive container, surrounding and covering the element with sodium beta-alumina, and baking in a furnace from 8 to 12 hours at a temperature in the range from 1400° C. to 1450° C.

2. A method of making an improved sensing element for a halogen gas leak detector as in claim 1, in which the porous ceramic tubular element is made of high purity alumina.

3. A method of making an improved sensing element for a halogen gas leak detector as in claim 1, in which the element is doped with sodium carbonate in a fluid dopant consisting of water and sodium carbonate, the element is then drained, and the element is then dried at a temperature of 71° C.

4. A method of making an improved sensor assembly for a halogen gas leak detector comprises providing at least one porous ceramic tubular element doped with sodium carbonate, positioning at least one such element in a high temperature, non-reactive container, surrounding and covering the element with sodium beta-alumina, baking in a furnace from 8 to 12 hours at a temperature in the range from 1400° C. to 1450° C., wrapping a helical heater coil snugly around the tubular element, positioning a platinum wire substantially within and supported by the tubular element, applying cement over the helical heater coil and the immediate juxtaposed portions of the tubular element, positioning the cemented sensor assembly in a high temperature, non-reactive container, surrounding and covering the sensor assembly with sodium beta-alumina, and curing the cement at a temperature of 1300° C. for a period of about one hour.

5. A method of making an improved sensor assembly for a halogen gas leak detector as in claim 4, in which the porous ceramic tubular element is made of high purity alumina.

6. A method of making an improved sensor assembly for a halogen gas leak detector as in claim 4, in which the element is doped with sodium carbonate in a fluid dopant consisting of water and sodium carbonate, the element is then drained, and the element is then dried at a temperature of 71° C.

* * * * *